Patented Sept. 19, 1922.

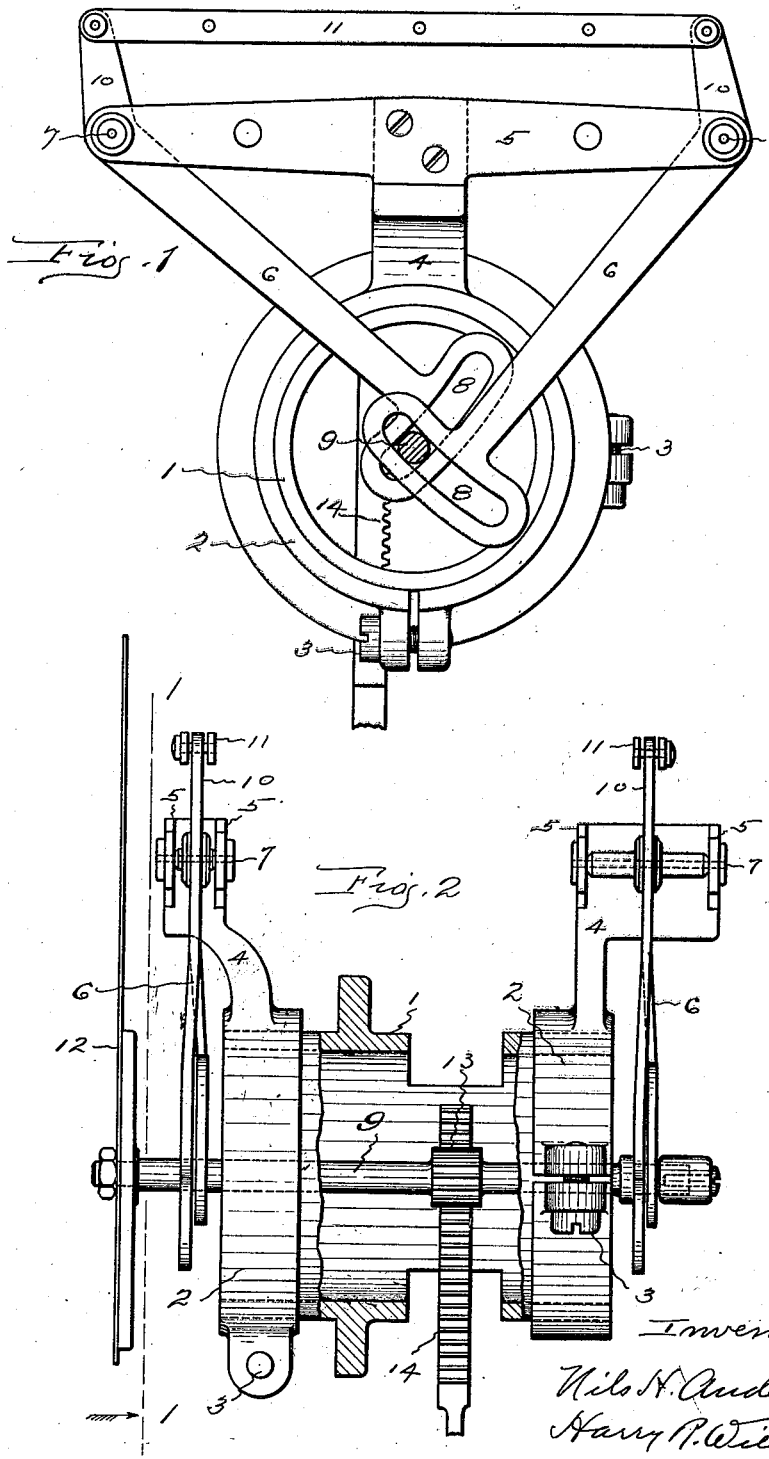

1,429,393

UNITED STATES PATENT OFFICE.

NILS H. ANDERSON, OF TRUMBULL, CONNECTICUT.

SENSITIVE SPINDLE BEARING.

Application filed June 23, 1921. Serial No. 479,784.

*To all whom it may concern:*

Be it known that I, NILS H. ANDERSON, a citizen of the United States, residing at Trumbull, in the county of Fairfield and State of Connecticut, have invented a new and useful Improvement in Sensitive Spindle Bearings, of which the following is a specification.

This invention relates to bearings for spindles which are primarily designed to carry the pointers of measuring or indicating machines, such as weighing scales, but which are also serviceable for other machines in which it is desirable to have the spindles mounted so as to be very sensitive.

The object of the invention is to provide a simple, inexpensive and compact bearing for a spindle in which the frictional resistance to the rotation of the spindle is reduced to a minimum.

This object is attained by mounting the spindle in arc shaped slots in the ends of pivoted links, the axes of which links are ninety degrees apart rotarily with relation to the axis of the spindle and are also the centers of the arcs on which the slots are formed.

In the accompanying drawings, Figure 1 shows a side elevation on enlarged scale of a spindle bearing for a weighing scale which embodies the invention. Fig. 2 shows an edge elevation of the bearing with a portion of the supporting hub broken away.

The hub 1 is a cylindrical casting provided with means for securing it in the frame of the machine in which the bearing is to be used. On each end of the hub is a split ring 2 that is clamped in position by a screw 3. Projecting up from each ring is a bracket 4 and secured to the inner and outer faces at the top of each bracket are horizontally extending parallel plates 5. The links, of which there are two on each side, are hung on small pivots 7 mounted in pivot bearings at the ends of the pairs of horizontal plates. In the free end of each link is a slot 8 the walls of which are formed on the arcs of concentric circles the center of which is the axis of the link in which the slot is formed. The slots are a few thousandths of an inch wider than the diameter of the spindle 9 which extends through the hub and through the curved slots in the ends of the links. Arms 10 extend from the upper ends of the links and these arms are connected by bars or rods 11 so that the links when swung will move coincidentally. On one end of the spindle shown is a pointer 12 and on the spindle in the hub is a pinion 13 that is engaged by an operating rack 14.

With this structure as the spindle is rotated by the rack and pinion it is held in exact position by the walls of the slots in the ends of the links, but it turns on the outer curved walls of the slots and swings the links as if they were large rolls mounted on the small pivots 7. This reduces the friction to a minimum and provides a bearing which will occupy but a small space in the machine to which it is applied.

The invention claimed is:

1. A spindle bearing comprising pairs of angularly disposed pivoted links with curved slots in the free ends of the links, said slots having concentric side walls curved on the arcs of circles the centers of which are the axes of the link pivots, and a spindle of substantially the diameter of the width of the slots passing through said slots.

2. A spindle bearing comprising pairs of angularly disposed pivoted links with curved slots in the free ends of the links, means connecting the links and synchronizing their movements and a spindle passing through said slots, said slots being substantially as wide as the diameter of the spindle and being curved on the arcs of circles the centers of which are the axes of the link pivots.

3. A spindle bearing comprising pairs of angularly disposed pivoted links with curved slots in the free ends of the links, said slots having concentric side walls curved on the arcs of circles the centers of which are the axes of the link pivots.

4. A spindle bearing comprising a supporting cylinder, a pair of parallel horizontally extending plates supported at each end of the cylinder, an arbor mounted at each end of each pair of plates, and a link mounted on each arbor, said link having in its free end an arcuate slot the center of which is the axis of the link.

5. A spindle bearing comprising a supporting cylinder, a ring clamped upon each end of the cylinder, a bracket extending upward from each ring, a pair of parallel horizontally extending plates attached to each bracket, an arbor mounted at each end of each pair of plates, and a link mounted on each arbor, said link having in its free end an arcuate slot the center of which is the axis of the link.

6. A spindle bearing comprising a supporting cylinder, a ring clamped upon each end of the cylinder, a bracket extending upward from each ring, a pair of parallel horizontally extending plates attached to each bracket, an arbor mounted at each end of each pair of plates, a link mounted on each arbor, said link having in its free end an arcuate slot the center of which is the axis of the link, arms projecting upward from the pivoted ends of the links, and a connection between said arms so that the links will swing coincidentally.

7. A spindle bearing comprising a supporting cylinder, a ring clamped upon each end of the cylinder, a bracket extending upward from each ring, a pair of parallel horizontally extending plates attached to each bracket, an arbor mounted at each end of each pair of plates, a link mounted on each arbor, said link having in its free end an arcuate slot the center of which is the axis of the link, arms projecting upward from the pivoted ends of the links, a connection between said arms so that the links will swing coincidentally, a spindle extending through the hub and the slots in the links, a pointer on one end of the spindle, and a pinion on the spindle in the cylinder.

NILS H. ANDERSON.